United States Patent

Morse

(10) Patent No.: US 6,720,870 B2
(45) Date of Patent: Apr. 13, 2004

(54) PROTECTIVE HELMET NAVIGATION SYSTEM

(76) Inventor: Kevin C. Morse, 5350 Kelly Rd., Flint, MI (US) 48504

( * ) Notice: Subject to any disclaimer, the term of this patent is extended or adjusted under 35 U.S.C. 154(b) by 8 days.

(21) Appl. No.: 10/054,043

(22) Filed: Jan. 22, 2002

(65) Prior Publication Data

US 2003/0137413 A1 Jul. 24, 2003

(51) Int. Cl.[7] .............................................. B60Q 1/26
(52) U.S. Cl. .................... 340/468; 362/105; 362/106
(58) Field of Search .............................. 340/468, 479; 362/105, 106, 473, 802

(56) References Cited

U.S. PATENT DOCUMENTS

| | | | |
|---|---|---|---|
| 4,559,516 A | 12/1985 | Schott et al. | |
| 4,559,586 A | * 12/1985 | Slarve | ......................... 362/106 |
| 4,891,736 A | 1/1990 | Gouda | |
| 4,956,752 A | 9/1990 | Foglietti | |
| 5,040,099 A | 8/1991 | Harris | |
| 5,207,500 A | 5/1993 | Rios et al. | |
| 5,704,707 A | 1/1998 | Gebelein et al. | |
| 5,910,764 A | 6/1999 | Hayden | |
| 6,113,243 A | * 9/2000 | Saul | ........................... 362/105 |
| 6,157,298 A | 12/2000 | Garfinkel et al. | |
| 6,406,168 B1 | * 6/2002 | Whiting | ..................... 362/473 |
| 6,464,369 B1 | * 10/2002 | Vega et al. | ................. 362/106 |
| 6,529,126 B1 | * 3/2003 | Henry | ........................ 340/467 |

* cited by examiner

Primary Examiner—John Tweel
(74) Attorney, Agent, or Firm—Dale J. Ream

(57) ABSTRACT

A protective helmet navigation system includes a helmet shell having a housing constructed of padded material covering a portion of back and side portions of the shell. The housing is positioned to provide enhanced protection of the back of a user's head and defines a control compartment and a plurality of light compartments. A light source is positioned in each light compartment and is electrically connected to a battery within the control compartment. The system includes a transmitter capable of being connected to the brake and turn signal controls of a motorcycle for transmitting a signal corresponding to an operation of an respective control. A receiver is mounted within the control compartment and electrically connected to the battery and light sources for permitting current to energize respective light sources upon reception of a respective signal. A lens covers each light compartment.

17 Claims, 4 Drawing Sheets

PROTECTIVE HELMET NAVIGATION SYSTEM

BACKGROUND OF THE INVENTION

This invention relates generally to protective helmets and, more particularly, to a protective helmet having remote-activated navigation signals.

In the past decade, Center High-Mounted Stop Lamps (CHMSL's) have become standard on automobiles. The use of such a braking signal in the rear window, or other similar position, of an automobile improves the braking response time of a following motorist and thus decreases accidents. Thus, a mechanism or system that can increase responsiveness to the braking or turning of a vehicle is beneficial and advantageous to traffic and pedestrian safety.

Various devices and systems are known in the art for providing helmets with braking and directional indicators, such as in U.S. Pat. No. 4,891,736 to Gouda and U.S. Pat. No. 6,157,298 to Garfinkel, et al. Although assumably effective for their intended purposes, the existing devices do not incorporate wireless directional and brake indicators in a protective padded housing mounted strategically along appropriate portions of a helmet shell.

Therefore, it is desirable to have a protective helmet navigation system which provides wireless brake and directional indicators corresponding to operation of respective signals of a motorcycle. Further, it is desirable to have a protective helmet navigation system in which the brake and directional indicators are embedded in a protective padded housing strategically positioned on the helmet for enhanced user safety and protection of system components.

SUMMARY OF THE INVENTION

A protective helmet navigation system includes a helmet shell having a bottom rim, opposing side portions, a back portion, a closed top, and a generally open front portion. The system includes a protective housing constructed of a resilient padding material, the housing being mounted to the outer surface of the back and side portions of the helmet shell. The housing includes a plurality of recessed areas. More particularly, the padded housing defines a control compartment centrally situated between a plurality of light compartments. A battery is positioned in the control compartment while a light source is positioned within each light compartment. Each light source is electrically connected to the battery.

The system also includes at least one transmitter capable of being electrically connected to the brake and directional controls of a motorcycle. This transmitter is adapted to generate a signal unique to an operation of a corresponding brake or directional signal control. A receiver is positioned in the control compartment and is electrically connected to the battery and the plurality of light sources. The receiver is capable of permitting current from the battery to energize a respective light source when a particular signal is received from the transmitter. Therefore, an operation of a brake control causes the transmitter to generate and transmit a signal which, when received by the receiver, causes the receiver to permit current to energize a particular light source.

Therefore, a general object of this invention is to provide a protective helmet navigation system in which brake and direction indicators embedded in a padded housing on the helmet may be wirelessly activated by a user.

Another object of this invention is to provide a system, as aforesaid, having a padded housing strategically positioned along back and side portions of the helmet shell for protecting the base and rear of a user's head from injury.

Still another object of this invention is to provide a system, as aforesaid, in which the padded housing mounted to the outer surface of the helmet shell defines a plurality of light compartments.

Yet another object of this invention is to provide a system, as aforesaid, which utilizes a plurality of light emitting diodes positioned in respective light compartments of the padded housing to indicate a motorcycle operator's navigational intentions.

A further object of this invention is to provide a system, as aforesaid, which transmits a radio signal having a predetermined frequency associated with an operation of a respective brake or directional control.

A still further object of this invention is to provide a system, as aforesaid, for increasing the visibility and safety of motorcycle operators, other vehicle operators, and pedestrians.

Another object of this invention is to provide a system, as aforesaid, having aerodynamic and compressible panels on rear and side portions of the helmet shell which absorb impact forces.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
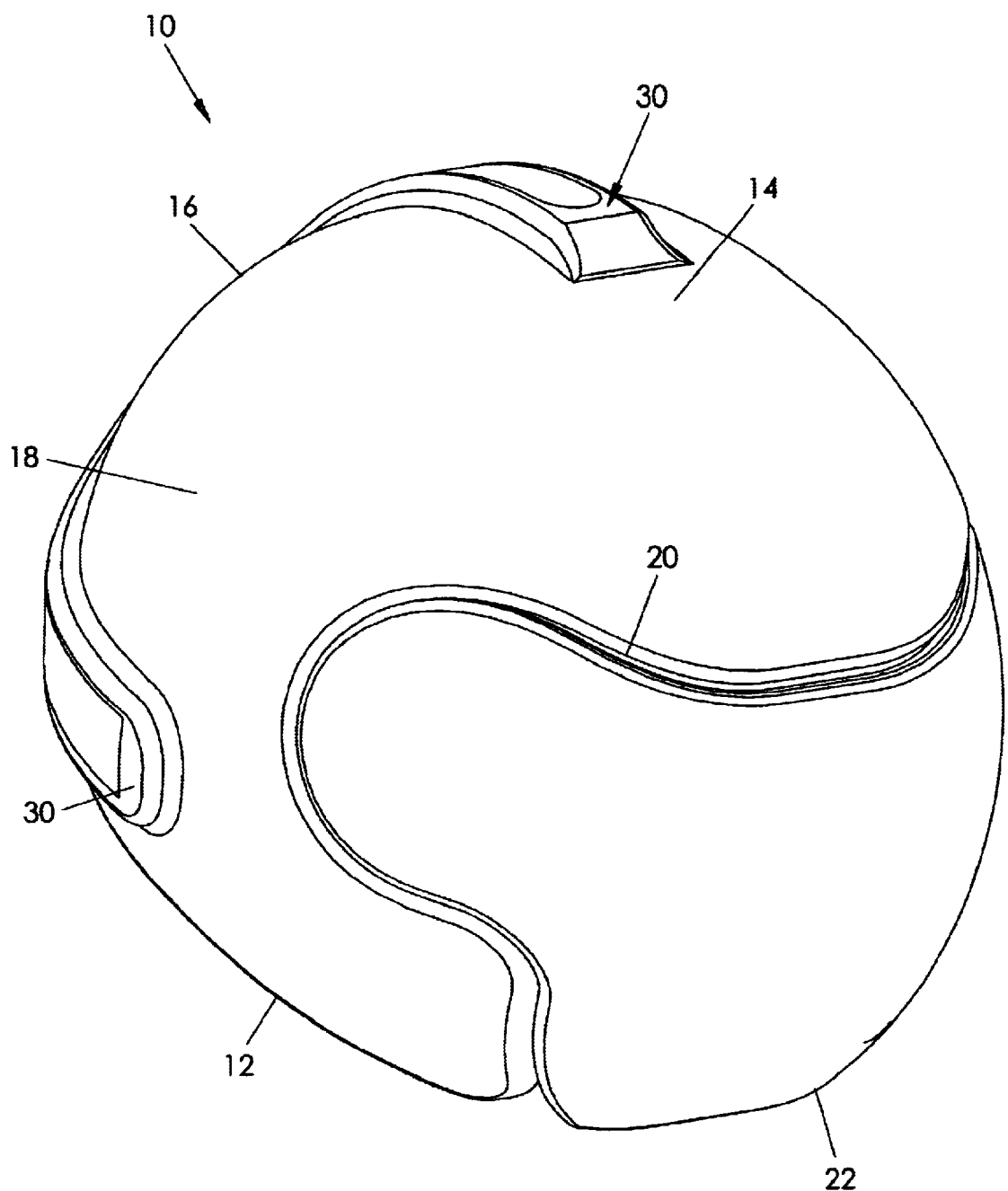
FIG. 1 is a front perspective view of a helmet shell according to the preferred embodiment of the present invention.
Figure 2:
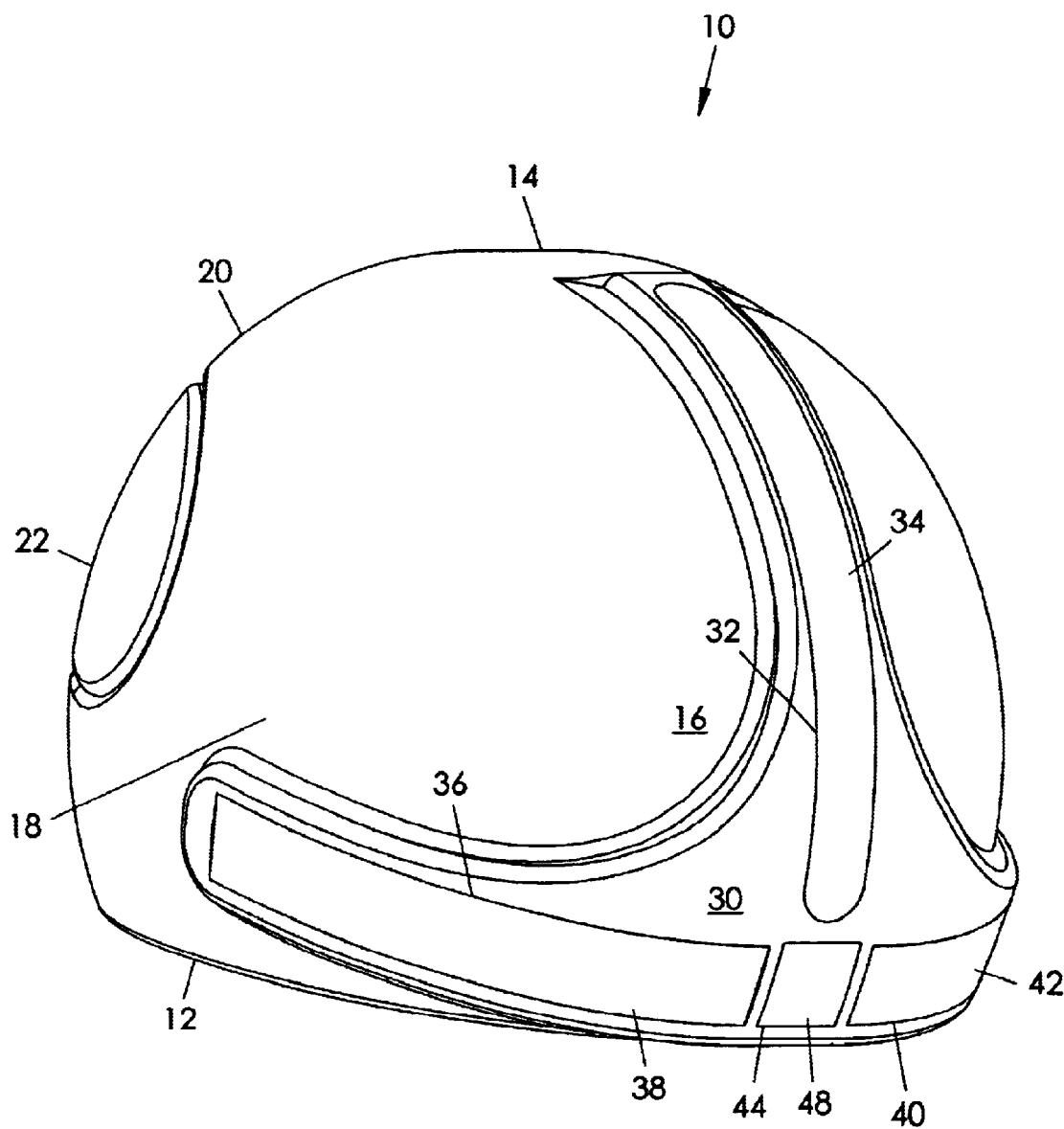
FIG. 2 is a rear perspective view of the helmet shell as in FIG. 1.

A protective helmet navigation system according to a preferred embodiment of the present invention will now be described in detail with reference to FIGS. 1 through 4 of the accompanying drawings. The protective helmet navigation system includes a helmet shell 10 having a bottom rim 12 which defines an open bottom, a closed top 14, a back portion 16, opposing side portions 18 and a generally open front portion 20. The helmet shell 10 may also include a transparent shield 22 as is conventional (FIGS. 1 and 2).

A protective housing 30 is mounted to the back portion 16 and side portions 18 of the helmet shell 10, the housing having a generally inverted T-shaped configuration. The housing 30 extends downwardly from the top 14 of the helmet shell 10 to the bottom rim 12 thereof and also extends generally parallel and adjacent to the bottom rim 12 (FIG. 2). The housing 30 may be mounted to the shell 10 with an adhesive such as glue or with other suitable hardware. Preferably, the housing 30 is constructed of a molded urethane padding material although other resilient materials would be suitable. The housing 30 is constructed so as to compress upon impact and thus absorb impact forces. Therefore, the resilient housing 30 is strategically positioned to protect the base and rear of a user's head from injury in case of an accident. The padded housing 30 simultaneously protects the signal indicators from damage, as will be described in more detail below. It is understood that the protective housing 30 is of sufficient thickness to accomplish both discussed protections.

Figure 3:
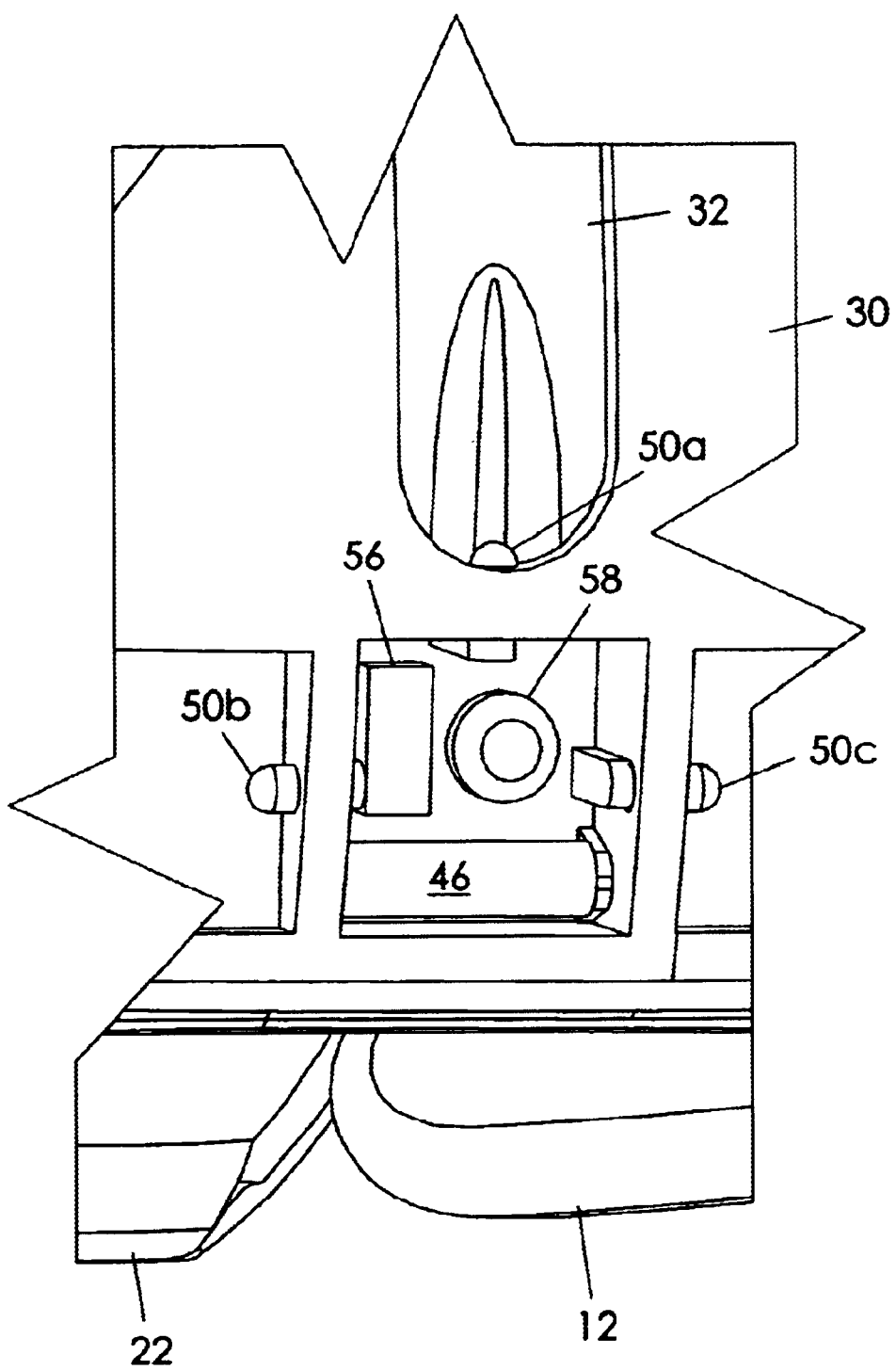
FIG. 3 is a fragmentary view of the helmet shell as in FIG. 2 with the control compartment door and light compartment lenses removed.

The protective housing 30 includes multiple recesses in which electronic components are effectively embedded and protected. More particularly, the housing 30 defines a first light compartment 32 embedded therein between the top 14 of the helmet shell 10 and a point spaced from the bottom rim 12 (FIG. 2). Second 36 and third 40 light compartments extend in opposite directions adjacent the bottom rim 12 and perpendicular to the first light compartment 32. The second 36 and third 40 light compartments extend across the side portions 18 of the helmet shell 10. The housing 30 further defines a control compartment 44 in which a battery 46 is removably mounted (FIG. 3). Accordingly, the battery 46 may be removed and replaced or recharged as the case may be. The control compartment 44 is preferably centrally located at the junction between the first 32, second 36, and third 40 light compartments. A door 48 is removably mounted to the housing 30 so as to selectively cover the opening defined by the control compartment 44 (FIG. 2).

The protective helmet navigation system includes a plurality of light sources 50 strategically positioned in the first 32, second 36, and third 40 light compartments. While a single light source 50 positioned in each light compartment is shown in FIG. 3, it is understood that each light source 50 may include multiple light emitting diodes, as to be further described later. Each light source 50 is positioned within a respective light compartment and is electrically connected to the battery 46 that is situated in the control compartment 44. The light source 50 positioned in the first light compartment 32 may be one color, e.g. red, while the light sources 50 in the second 36 and third 40 light compartments may be another color, e.g. orange or yellow, in that the first light compartment 32 corresponds to an operation of a brake control while the second 36 and third 40 compartments correspond to directional controls (e.g. turn signals), as to be described in more detail below.

Figure 4:
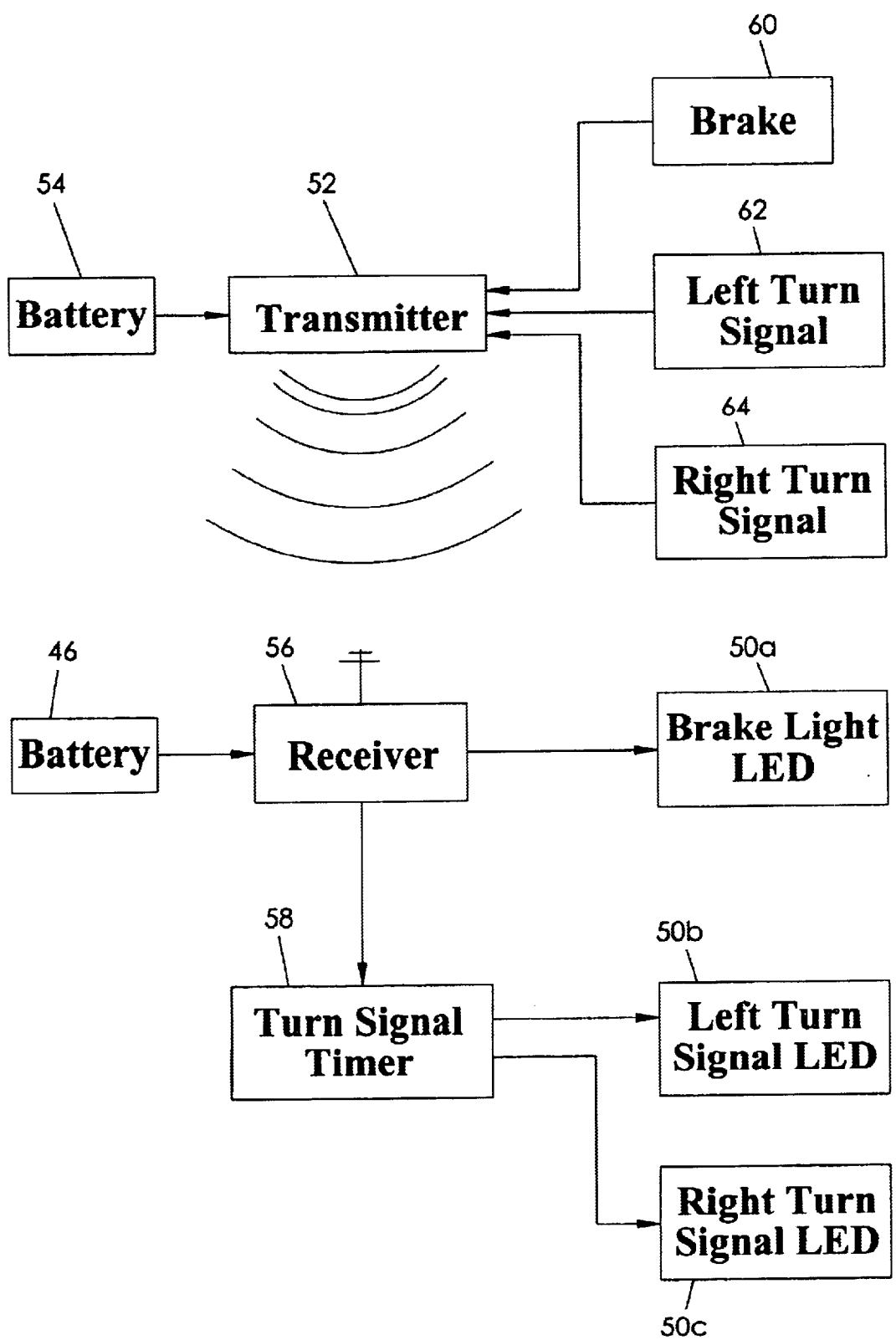
FIG. 4 is a block diagram of the protective helmet navigation system according to the preferred embodiment of this invention.

Preferably, each light source 50 is a light emitting diode although other light sources would work, such as incandescent bulbs. In FIGS. 3 and 4, the brake, and turn signal LED's are indicated with reference numerals 50a, 50b, and 50c. LED's are the preferred light source because of their significantly faster turn-on time over conventional light sources as well as for their low cost and long-life. LED's also cause less of a current drain on a battery. It is understood that while a single light source 50 may be positioned in each light compartment, multiple LED's would also be suitable. They may be spaced apart or grouped together. In fact, multiple LED's may be positioned in a respective light compartment and energized sequentially so as to more distinctly indicate an operator's navigational intent (e.g. sequentially illuminating the LED's in a leftward pattern to indicate a left turn).

Each light compartment 32, 36, 40 defines an opening that is covered by a respective acrylic plastic lens 34, 38, 42, each lens being coupled to the protective housing 30. Each lens is shatter and scratch-resistant and may be styled in various shapes or designs. Preferably, the lenses are Fresnel lenses which include a series of concentric grooves that serve as retracting surfaces like a tiny prism for gathering and emitting light from the light sources 50 in a highly efficient manner. Of course, lenses having other optical qualities such as pillow optics for efficient light dispersion would also be suitable. It is understood that the lenses may be clear or colored.

The protective helmet navigation system includes at least one transmitter 52. The transmitter 52 is capable of being electrically connected to the brake 60 and directional controls 62, 64 of an open motorized vehicle such as a motorcycle, all-terrain vehicle, etc. (FIG. 4). The transmitter 52 may be powered by its own battery 54 or connected to the battery of the motorcycle. The transmitter 52 is also capable of generating unique signals, each signal corresponding to respective brake and directional controls to which the transmitter 52 is connected. The transmitter 52 transmits the signal through the ambient air when the brake 60 or directional controls 62, 64 are activated on the motorcycle. The signal may be generated and transmitted as an RF signal having a predetermined frequency, although infrared signals or the like would also work. For example, actuation of the motorcycle brake pedal would cause the transmitter 52 to generate and transmit a signal having a predetermined radio frequency.

A receiver is positioned in the control compartment 44 and is electrically connected intermediate the battery 46 and each light source 50. The receiver 56, which may include a miniature antenna, is capable of receiving a signal from the transmitter 52 and permitting current to flow from the battery 46 to whichever light source 50 is indicated by the transmitted signal. For example, the receiver 56 would allow current to pass from the battery 46 to the light source 50 in the first light compartment 32 upon receiving the signal having the appropriate predetermined frequency.

A turn signal timer 58 is also mounted within the control compartment 44 and included in the electrical circuit between the battery 46 and light sources 50 of the second 36 and third 40 light compartments. The turn signal timer 58 is of conventional design and allows the appropriate light sources indicative of turn signal operations to be intermittently energized for a predetermined period of time.

The navigation system may also include a second transmitter (not shown) connected to an emergency switch on the motorcycle. This second transmitter is capable of generating and transmitting another RF signal upon operation of the emergency switch by a user. This signal would also have a predetermined frequency such that the receiver 56 is capable of permitting current to simultaneously energize all of the light sources 50 upon receiving the signal. It is understood that the light sources 50 may alternatively be intermittently energized to indicate an emergency or cautionary condition. It should also be understood that the first transmitter 52 may be adapted to include the function of the second transmitter as previously described.

In operation, the transmitter 52 may be electrically connected to the brake and directional signal controls of a motorcycle or other open motorized vehicle (FIG. 4). Upon actuation of a respective motorcycle navigation control, the transmitter 52 generates and transmits a predetermined corresponding RF signal into the ambient air. Upon receiving a predetermined signal, the receiver 56 embedded in the protective padded housing 30 on the helmet shell 10 permits current to pass from the battery 46 to a respective light source 50. When the light source 50 situated in the second 36 or third 40 light compartment is energized (e.g. a turn signal indicator), the turn signal timer 58 is also actuated so as to control the duration and intermittency of current flow. As the electrical components of this system are delicate, it is important to fully appreciate the necessity and strategic placement of the protective padded housing 30 on the outer surface of the helmet shell 10.

Accordingly, the protective helmet navigation system provides a wireless remote-activated indicator apparatus embedded within a protective padded housing mounted to the back and sides of a safety helmet. This system contributes to the safety of the motorcycle operator, other vehicle operators, and pedestrians.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A protective helmet navigation system with remote activated navigation signals for use with the brake and turn signal controls of an open motorized vehicle, said helmet comprising:
   a shell having a bottom rim, opposing side portions, a back portion, a closed top, and a generally open front portion;
   a housing constructed of resilient padding material mounted to an outer surface of said back and side portions of said shell, said housing defining a control compartment and a plurality of light compartments;
   a battery positioned in said control compartment;
   a plurality of light sources, each light source being electrically connected to said battery and positioned in a respective light compartment; and
   means connected to the brake and turn signal controls of an open motorized vehicle for selectably energizing respective light sources.

2. The protective helmet navigation system as in claim 1 wherein said plurality of light compartments comprise:
   a first light compartment having a generally rectangular configuration recessed in said padding material of said housing, said first light compartment being positioned on said back portion generally intermediate said opposing side portions and extending substantially between said bottom rim and said top;
   a second light compartment having a generally rectangular configuration recessed in said padding material of said housing, said second light compartment being positioned perpendicular to said first light compartment upon one of said opposing side portions; and
   a third light compartment having a generally rectangular configuration recessed in said padding material of said housing, said third light compartment being positioned perpendicular to said first light compartment upon another of said opposing side portions.

3. The protective helmet navigation system as in claim 1 wherein each light compartment defines an opening and includes a lens covering said open top.

4. The protective helmet navigation system as in claim 1 wherein said means for energizing said plurality of light sources comprises:
   a transmitter adapted to be electrically connected to said brake and turn signal controls of said open motorized vehicle, said transmitter adapted to generate and transmit a signal indicative of an operation of a respective brake or turn signal control; and
   a receiver positioned in said control compartment and electrically connected to said battery and to said plurality of light sources, said receiver adapted to receive said transmitted signal and to permit current to energize respective light sources according to said transmitted signal.

5. The protective helmet navigation system as in claim 1 wherein each light source is a light emitting diode.

6. The protective helmet navigation system as in claim 1 further comprising a timer electrically connected to said receiver and to respective light sources, said timer adapted to intermittently permit current to energize a particular respective light source according to said transmitted signal for a predetermined amount of time.

7. The protective helmet navigation system as in claim 1 wherein said battery is rechargeable.

8. The protective helmet navigation system as in claim 4 further comprising another transmitter electrically connected to an emergency indicator switch mounted on said open motorized vehicle and adapted to selectably transmit another signal, said receiver adapted to permit current from said battery to simultaneously energize said plurality of light sources upon receiving said another signal, whereby to indicate an emergency situation.

9. The protective helmet navigation system as in claim 1 wherein said housing is constructed of molded urethane.

10. A protective helmet navigation system with remote activated navigation signals for use with the brake and turn signal controls of a motorcycle, said helmet comprising:
    a shell having a bottom rim, opposing side portions, a back portion, a closed top, and a generally open front portion, said shell having an outer surface;
    a housing mounted to said outer surface along said back and side portions of said shell, said housing being constructed of padded material capable of absorbing impact forces, said housing defining a control compartment and first, second, and third light compartments;
    wherein said second and third light compartments are mounted adjacent and parallel to said bottom rim of said shell along respective opposing side portions so as to provide enhanced protection of the base and rear of a user's head when wearing said shell thereon;
    a first, second, and third light source positioned in said first, second, and third light compartments, respectively;
    a battery removably mounted in said control compartment and electrically connected to said first, second, and third light sources;
    a first transmitter adapted to be electrically connected to the brake and turn signal controls of a motorcycle, said first transmitter being adapted to generate and transmit a signal indicative of an operation of a respective brake or turn signal control; and
    a receiver positioned in said control compartment and electrically connected intermediate said battery and said first, second, and third light sources, said receiver permitting current from said battery to energize said first, second, and third light sources, respectively, upon receiving said transmitted signal.

11. The protective helmet navigation system as in claim 10 wherein said first light compartment is positioned on said back portion normal to said second and third light compartments and generally intermediate said opposing side portions.

12. The protective helmet navigation system as in claim 10 wherein said first, second, and third light compartments define respective openings and include respective lenses covering said respective openings.

13. The protective helmet navigation system as in claim 12 wherein said respective lenses are Fresnel lenses, each Fresnel lens having a series of concentric grooves that act as refracting surfaces for efficient gathering and emission of light emitted from respective light sources.

14. The protective helmet navigation system as in claim 10 wherein said control compartment is situated intermediate said second and third light compartments.

15. The protective helmet navigation system as in claim 10 further comprising a second transmitter electrically connected to an emergency indicator switch mounted on said motorcycle and adapted to selectably transmit another signal, said receiver adapted to permit current from said battery to simultaneously energize said plurality of light sources upon receiving said another signal, whereby to indicate an emergency situation.

16. The protective helmet navigation system as in claim 10 wherein said first, second, and third light sources each include multiple light emitting diodes.

17. The protective helmet navigation system as in claim 16 further comprising means for sequentially energizing said multiple light emitting diodes of said second and third light sources, whereby to further indicate operation of a respective turn signal control.

\* \* \* \* \*